United States Patent
LiPiShan et al.

(10) Patent No.: US 9,969,912 B2
(45) Date of Patent: May 15, 2018

(54) HOT MELT ADHESIVE COMPOSITION WITH ETHYLENE/α-OLEFIN MULTI-BLOCK COPOLYMER

(71) Applicant: Dow Global Technologies LLC, Midland, MI (US)

(72) Inventors: Colin LiPiShan, Pearland, TX (US); Cynthia L. Rickey, Lake Jackson, TX (US); Alex Y. Wang, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 29 days.

(21) Appl. No.: 15/100,497

(22) PCT Filed: Dec. 22, 2014

(86) PCT No.: PCT/US2014/071845
§ 371 (c)(1),
(2) Date: May 31, 2016

(87) PCT Pub. No.: WO2015/102989
PCT Pub. Date: Jul. 9, 2015

(65) Prior Publication Data
US 2016/0304756 A1 Oct. 20, 2016

Related U.S. Application Data (60) Provisional application No. 61/922,369, filed on Dec. 31, 2013.

(51) Int. Cl.
C09J 157/00 (2006.01)
C09J 153/00 (2006.01)
C09J 123/08 (2006.01)

(52) U.S. Cl.
CPC ....... *C09J 153/00* (2013.01); *C09J 123/0815* (2013.01); *C09J 157/00* (2013.01)

(58) Field of Classification Search
None
See application file for complete search history.

(56) References Cited

U.S. PATENT DOCUMENTS

| | | |
|---|---|---|
| 6,319,979 B1 | 11/2001 | Dubois |
| 7,199,180 B1 | 4/2007 | Simmons |
| 7,247,796 B2 * | 7/2007 | Hagen ............... C08L 53/02 174/110 R |
| 7,378,481 B1 | 5/2008 | Gong et al. |
| 7,531,601 B2 | 5/2009 | Karjala et al. |
| 7,608,668 B2 | 10/2009 | Li Pi Shan et al. |
| 7,858,706 B2 | 12/2010 | Arhola et al. |
| 7,893,166 B2 | 2/2011 | Shan et al. |
| 7,947,793 B2 | 5/2011 | Marchand et al. |
| 2006/0199897 A1 | 9/2006 | Karjala et al. |
| 2007/0135563 A1 | 6/2007 | Simmons |
| 2008/0306217 A1 | 12/2008 | Karjala et al. |
| 2009/0306281 A1 | 12/2009 | Tancrede et al. |
| 2012/0259050 A1 | 10/2012 | Vitrano et al. |

FOREIGN PATENT DOCUMENTS

DE 102005007770 A1 8/2006

OTHER PUBLICATIONS

Eastman Technical Data Sheet for Eastotac H-142R; no date.*
Dobrynin, J. Chem. Phys. 107 (21), Dec. 1, 1997, pp. 9234-9238.
Potemkin, et al., Physical Review E, vol. 57, No. 6, Jun. 1998, pp. 6902-6912.
Williams, et al., Polymer Letters, vol. 6, 1968, pp. 621-624.

* cited by examiner

*Primary Examiner* — David J Buttner
(74) *Attorney, Agent, or Firm* — Husch Blackwell LLP (57) ABSTRACT

The present disclosure is directed to a hot melt adhesive composition including: a) an ethylene/α-olefin multi-block copolymer having a weight molecular weight (Mw) less than 20,000; b) a tackifier having a softening temperature from 90° C. to 150° C.; and c) a wax.

11 Claims, 1 Drawing Sheet

HOT MELT ADHESIVE COMPOSITION WITH ETHYLENE/α-OLEFIN MULTI-BLOCK COPOLYMER

FIELD

The present disclosure is directed to hot melt adhesive compositions and articles including the hot melt adhesive compositions.

BACKGROUND

Hot-melt adhesives (HMAs) are generally solid materials at ambient temperature and can be heated to a melt to hold adherents or substrates together upon cooling and solidifying. Hot-melt adhesives offer the possibility of almost instantaneous bonding that make them excellent candidates for automated operations. HMAs can be used in paper products, packaging materials, and disposable goods, for example have many commercial applications.

Hot melt adhesives are widely used in the packaging industry to seal cardboard cases, trays and cartons. Many types of packaging applications require the use of an adhesive that is both heat resistant and cold tolerant. The hot melt adhesive used to seal the containers must have heat resistance and cold resistance particularly during transportation and storage. Sealed containers being transported and/or stored within a truck or rail car are exposed to very high temperatures in the summer (up to 75° C. or higher) and very low temperatures in the winter (down to −30° C. or lower). Thus, hot melt adhesives used in packaging applications need to be strong enough such that the sealed containers will not pop open during the transportation process.

HMAs are generally based on a polymer, a tackifier, and a wax. Fischer-Tropsch waxes (FT waxes) are commonly used as the wax component. Compared to other waxes (such as microcrystalline waxes and paraffin waxes), FT waxes have a higher melting temperature and a lower viscosity. FT waxes provide conventional HMAs with suitable heat resistance and adhesion performance for packaging applications.

FT waxes, however, are expensive and limit sourcing options for hot melt adhesive formulators. A need therefore exists for hot melt adhesive compositions, that meet the performance of conventional HMAs with FT wax, yet do not require a FT wax. A need further exists for such FT wax-free HMA compositions to exhibit both high temperature adhesive performance and low temperature adhesion performance.

SUMMARY

The present disclosure is directed to hot melt adhesive compositions and articles including the hot melt adhesive compositions.

In an embodiment, the hot melt adhesive composition includes:
a) an ethylene/α-olefin multi-block copolymer having a weight average molecular weight (Mw) less than 20,000;
b) a tackifier having a softening temperature from 90° C. to 150° C.; and
c) a wax.

DETAILED DESCRIPTION

Figure 1:
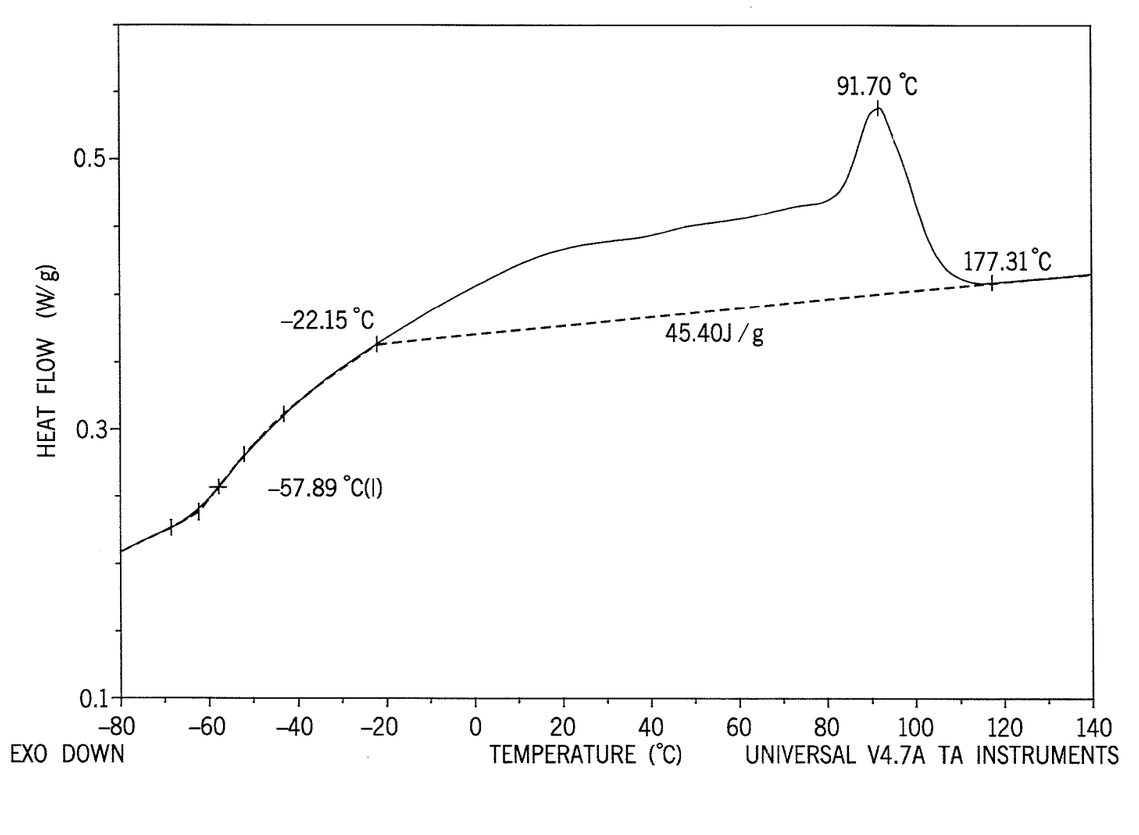
FIG. 1 is a DSC melt profile for an ethylene/α-olefin multi-block copolymer in accordance with an embodiment of the present disclosure.

The present disclosure provides a hot melt adhesive (HMA) composition. In an embodiment, the HMA composition includes: a) an ethylene/α-olefin multi-block copolymer having a weight average molecular weight less than 20,000 g/mol; b) a tackifier having a softening temperature from 90° C. to 150° C.; and c) a wax.

A. Ethylene/α-olefin Multi-block Copolymer

The present HMA composition includes an ethylene/α-olefin multi-block copolymer. The ethylene/α-olefin multi-block copolymer has a weight average molecular weight (Mw) less than 20,000 g/mol.

The term "ethylene/α-olefin multi-block copolymer" and includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

$$(AB)_n$$

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments and is defined as having:

a Mw from 5,000 to less than 20,000, a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc; and

Tm is from 80° C., or 85° C., or 90° C., to 95, or 99° C. or 100° C., or 103° C., or 105° C., or 107° C., or 109° C.

In an embodiment, the ethylene/α-olefin multi-block copolymer is an ethylene/octene multi-block copolymer and has one, some, any combination of, or all the properties (i)-(viii) below:

(i) a weight average molecular weight (Mw) less than 20,000, or from 5,000, or 7,000 or 9,000, or 10,000 or 12,000 to 14,000, or 15,000, or 17,000, or 18,000, or 19,000 or 19,900;

(ii) a melt temperature (Tm) from 80° C., or 83° C., or 85° C., or 87° C. to 90° C., or 92° C., or 93° C., or 95° C., or 97° C., or 99° C., or 100° C., or 103° C., or 105° C., or 107° C., or 109° C.;

(iii) a density from 0.86 g/cc, or 0.87 g/cc, to 0.88 g/cc, or 0.89 g/cc;

(iv) a Brookfield viscosity at 177° C. from 500 eP, or 1,000 eP, or 3,000 eP, or 5,000 eP, or 6,000 cP to 7,000 cP, or 8,000 cP, or 9,000 cP, or 10,000 cP;

(v) 50-80 wt % soft segment and 40-20 wt % hard segment;

(vi) from 10 mol %, or 13 mol % to 14 mol %, or 15 mol % octene in the soft segment;

(vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and (viii) a melt index (MI) from 100 g/10 min, or 250 g/10 min, or 500 g/10 min, or 700 g/10 min, or 750 g/10 min, or 800 g/10 min to 850 g/10 min, or 900 g/10 min, or 950 g/10 min, or 1000 g/10 min, or 2000 g/10 min.

In an embodiment, the ethylene/octene multi-block copolymer is ethylene/α-olefin multi-block copolymer-B as shown in Table 2A.

The ethylene/α-olefin multi-block copolymer is from 20 wt %, or 25 wt %, or 30 wt % to 35 wt %, or 40 wt % of the total weight of the present HMA composition.

The present HMA composition may contain one or more ethylene/α-olefin multi-block copolymer.

The present ethylene/α-olefin multi-block copolymer may comprise two or more embodiments disclosed herein.

B. Tackifier

The present HMA composition includes a tackifier. The tackifier has a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the HMA composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof. The amount of tackifier in the present HMA composition can be from 20 wt %, or 25 wt %, or 30 wt % to 35 wt %, or 40 wt %, or 45 wt %, or 50 wt %, or 55 wt %, or 60 wt % of the total weight of the HMA composition.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term. Useful examples include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of about 140° C. Other useful tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™. Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ 1310LC, ESCOREZ 2596 from ExxonMobil Chemical Company, Houston, Tex. or PICCOTAC 1095, PICCOTAC 9095 from Eastman Chemical Company, Kingsport, Tenn.) and the hydrogenated derivatives thereof; alicyclic petroleum hydrocarbon resins and the hydrogenated derivatives thereof (e.g., ESCOREZ 5300 and 5400 series from ExxonMobil Chemical Company; EASTOTAC resins from Eastman Chemical Company). In some embodiments, the tackifiers include hydrogenated cyclic hydrocarbon resins (e.g., REGALREZ and REGALITE resins from Eastman Chemical Company).

In an embodiment, the tackifying agent is free of groups with which the silanol group of either the silane-grafted amorphous polyalpha-olefin or the silane-grafted ethylene/α-olefin multi-block copolymer will react.

C. Wax

The HMA composition includes a wax. The wax may be used to reduce the melt viscosity of the HMA composition. Nonlimiting examples of suitable waxes include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. Modified waxes, including vinyl acetate modified waxes such as AC-400 (Honeywell) and MC-400 (available from Marcus Oil Company), maleic anhydride modified waxes such as Epolene C-18 (available from Eastman Chemical) and AC-575A and AC-575P (available from Honeywell) and oxidized waxes are also suitable. CallistaR™ 122, 158, 144, 435, and 152 available from Shell Lubricants, Houston, Tex.; ParaflintR™ C-80 and ParaflintR™ H-1, H-4 and H-8, Fischer-Tropsch waxes available from Sasol-SA/Moore & Munger, Shelton, Conn. are also suitable.

In an embodiment, the wax is a paraffin wax. A "paraffin wax" is a colorless or white, somewhat translucent, hard wax including a mixture of solid straight-chain hydrocarbons ranging in melting point from about 48° to 66° C. (120° to 150° F.). Paraffin wax is obtained from petroleum by dewaxing light lubricating oil stocks. It is used in candles, wax paper, polishes, cosmetics, and electrical insulators.

Paraffin waxes are commonly available as by-products from crude distillation processes. Nonlimiting examples of suitable paraffin waxes include paraffin waxes available from Sasolwax (SA) such as Sasolwax 3456, 5006, 5105, 5415, 56-3, 5606, and 5803 which are available in range of melting points from 50–61° C. Other suppliers of paraffin wax include Sigma-Aldrich Chemicals (Product #32704, paraffin wax, melting point from 53–57° C.); product #32712, paraffin wax (melting point from 58–62° C.), and product #411663, paraffin wax (melting point >65° C.). Additionally, paraffin waxes are available from Southwest Wax (Utica, N.Y. USA); such as SDW 2006-002 (Melting Point: 52° C.); Scale Wax; BW 407 (Melting Point: 53° C.); BW 422 (Melting Point 61° C.); BW 436 (Melting Point: 67° C.) BW 450 (Melting Point 54° C.); and Semi-Refined Paraffin Wax.

In an embodiment, the wax is a microcrystalline wax. A "microcrystalline wax" is a petroleum-derived wax, is a solid at room temperature, and contains substantial proportions of branched and cyclic (naphthenes, alkyl- and naphthene-substituted aromatics) hydrocarbons, in addition to saturated normal alkanes. Microcrystalline wax has a crystal lattice micro-structure characterized by the presence of strongly branched isoparaffins and naphthenes, which inhibit crystallization. The crystal lattice micro-structure provides the microcrystalline wax with a strong affinity for oil. Microcrystalline wax is produced from a combination of heavy oil distillates and from the sediments of paraffinic crude oil (settling waxes). Microcrystalline wax is distinct and differs from other wax types. Microcrystalline wax excludes animal wax, vegetal wax, bacterial wax, mineral wax, and synthetic wax.

Microcrystalline wax is also distinct from, and excludes, paraffin wax. Microcrystalline wax has a higher concentration of complex branched hydrocarbons with tertiary and quaternary carbon atoms compared to paraffin wax. Unlike paraffin wax, microcrystalline wax holds oil tightly in the crystal lattice of the microcrystalline wax, and the oil does not migrate to the surface. Petrolatum and/or microcrystalline wax may be hydrotreated (hydrogenation) to remove discoloration.

Table 1 shows nonlimiting properties for paraffin wax and microcrystalline wax.

TABLE 1

| | Wax | |
|---|---|---|
| Property | Paraffin | Microcrystalline |
| flash point, closed cup, ° C. | 204 | 260 |
| viscosity at 98.9° C., mm$^2$/s | 4.2-7.4 | 10.2-25 |
| melting range, ° C. | 46-68 | 60-93 |
| refractive index at 98.9° C. | 1.430-1.433 | 1.435-1.445 |
| average molecular weight | 350-420 | 600-800 |
| carbon atom per molecule | 20-26 | 30-75 |
| ductibility/crystallinity of solid wax | friable to crystalline | ductile-plastic to tough-brittle |

Nonlimiting examples of suitable microcrystalline wax include those available from Baker-Hughes: BE Square 175 wax (84° C. melting point), BE Square 165 wax (71° C. melting point), ULTRAFLEX wax (69° C. melting point), and VICTORY wax (77° C. melting point). Other higher melting point microcrystalline waxes available include BARECO C-700 (92° C. melting point) wax, BARECO C-710 wax (99° C. melting point wax), BERCO C-1035 (94° C. melting point), BE SWUARE 180 wax (86° C.), BE SQUARE 185 wax (91° C. melting point), BE SQUARE 195 wax (92° C. melting point), MEKON wax (94° C. melting point), and STARWAX 100 wax (88° C. melting point); other examples from SASOLWAX include Sasolwax 0907 (83-94° C. melting point), Sasolwax 1800 (70-80° C. melting point), Sasolwax 2528 (72-76° C. melting point), Sasolwax 3279 (76-82° C. melting point), Sasolwax 3971 (70-75° C. melting point), Sasolwax 3973 (70-76° C. melting point), Sasolwax 6147 (62-66° C. melting point), Sasolwax 7334 (66-72° C. melting point), and Sasolwax 7835 (70-80° C. melting point).

In an embodiment, the wax component of the present HMA composition is a Fischer-Tropsch wax. A "Fischer-Tropsch wax" is a synthetic wax produced by the Fischer-Tropsch process. The Fischer-Tropsch process is a method for the synthesis of hydrocarbons and other aliphatic compounds from synthesis gas, a mixture of hydrogen and carbon monoxide in the presence of a catalyst. The hydrogen-carbon monoxide gas mixture is obtained by coal gasification or natural gas reforming. The process is named after F. Fischer and H. Tropsch, the German coal researchers who discovered it in 1923. Synthesized hydrocarbons are fractionated to different grades of FT waxes with chain length up to C100, qualified by their saturated-linear chains, free of aromatics, sulphurs and nitrogens.

In an embodiment, the wax component of the present HMA composition excludes Fischer-Tropsch wax.

The amount of wax in the present HMA composition is from 20 wt %, or 25 wt %, or 30 wt % to 35 wt %, or 40 wt % of the total weight of the present HMA composition.

In an embodiment, the HMA composition is applied in the form of a melt at a temperature from 50° C., or 65° C., or 75° C. to 115° C., or 130° C., or 150° C. The HMA composition can be applied using a wide variety of application techniques including, e.g., linear extruder, hand gun, other forms of extruder beads, and combinations thereof. The substrates are subsequently joined within the open time of the applied composition, the duration of which depends on the composition of the applied mixture.

The wax component may comprise two or more embodiments described herein.

D. Blend Component/Second Polymer

The present HMA composition may optionally include one or more other polymeric components as a blend component. Nonlimiting examples of suitable blend components include propylene-based polymer and ethylene-based polymer (functionalized and un-functionalized), ethylene-vinyl acetate (EVA), ethylene/vinyl alcohol copolymers (ethylene/methacrylic acid or acrylic acid copolymers and ionomers thereof), polystyrene, impact modified polystyrene, ABS, styrene/butadiene block copolymers and hydrogenated derivatives thereof (SBS and SEBS), thermoplastic polyurethanes, poly(butene-1-co-ethylene) polymers and low molecular weight and/or high melt index ethylene n-butyl acrylate copolymers.

E. Additives

The present HMA composition can optionally include other additives. Nonlimiting examples of suitable additives include fillers, waxes, plasticizers thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants antiblocking agents, nucleating agents, flame retardants and combinations thereof. The type and amount of other additives is selected to minimize the present of moisture that can prematurely initiate cure of the HMA composition. Suitable fillers include, e.g., fumed silica, precipitated silica, talc, calcium carbonates, carbon black, aluminasilicates, clay, zeolites, ceramics, mica, titanium dioxide, and combinations thereof.

F. HMA Compositions

In an embodiment, the present HMA composition includes a) from 15 wt % to 50 wt %, or from 25 wt % to 35 wt % of the ethylene/α-olefin multi-block copolymer with a Mw from 5,000 to less than 20,000 and any combination of properties (i)-(viii);

b) from 25 wt % to 60 wt % or from 35 wt % to 50 wt % tackifier; and c) from 15 wt % to 45 wt %, or from 25 wt % to 35 wt % wax selected from paraffin wax, microcrystalline wax, and combinations thereof. The HMA composition has a mandrel flex value (0° C.) from 80% to 100% and a mandrel flex value (−18° C.) from 80% to 100%. In a further embodiment, the HMA composition has any combination of the following properties (d)-(h):

(d) a Brookfield viscosity measured at 177° C. from 500 cP to 10000 cP, or from 500 cP to 3000 cP;

(e) a softening point from 60° C. to 100° C. or from 60° C. to 80° C.;

(f) a PAFT from 30° C. to 70° C. or from 30° C. to 55° C.;

(g) a SAFT from 50° C. to 100° C. or from 60° C. to 80° C.;

(h) a heat stress temperature from 30° C. to 70° C. or from 35° C. to 50° C.

The present HMA composition may comprise two or more embodiments disclosed herein.

G. Article

The present disclosure provides an article. The article includes any of the present HMA compositions. Nonlimiting examples of suitable articles include paper products, packaging materials, laminated wood panels, kitchen countertops, vehicles, tapes, labels, cases, cartons, trays, medical devices, bandages, and melt-blown fibers, books, bitumen roofing, health and hygiene articles such as disposable diapers, hospital pads, feminine sanitary napkins, and surgical drapes.

The present article may comprise two or more embodiments described herein.

Definitions

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Test Methods

Melt Index

Melt index (MI or I2) is measured in accordance with ASTM D-1238 (190° C.; 2.16 kg). The result is reported in grams/10 minutes.

Density

Density is measured in accordance with ASTM D-792. The result is reported in gamma (g) per cubic centimeter, or g/cc.

Gel Permeation Chromatography (GPC)

Conventional GPC measurements are used to determine the weight-average (Mw) and number-average (Mn) molecular weight of the polymer, and to determine the MWD (=Mw/Mn). Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four Mixed A 20 µm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M_{polyethylene} = a*(M_{polystyrene})^b.$$

In this equation, a=0.4316 and b=1.0 (as described in Williams and Ward J, Polym. Sc., Polym. Let., 6, 621 (1968)). Polyethylene equivalent molecular weight calculations were performed using VISCOTEK TriSEC software Version 3.0.

Differential Scanning Calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Melt Viscosity

Melt viscosity is determined by ASTM D3236, which is incorporated herein by reference, using a Brookfield Laboratories DVII+ Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 1 inch wide, 5 inches long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on, and set to a shear rate which leads to a torque reading in the range of 40 to 70 percent. Readings are taken every minute for about 15 minutes, or until the values stabilize, and then the final reading is recorded. The results are reported in milliPascal-second, or mPa-s.

Softening Point

Ring-and-ball softening point is measured using a Mettler Toledo FP900 Thermosystem according to ASTM E28.

Heat Stress

The heat stress resistance (heat stress) is measured according to the "Suggested Test Method for Determining the Heat Stress Resistance of Hot Melt Adhesives", method T-3006, prepared by the Institute of Packaging Professions (IoPP). To prepare one sample, two cardboard coupons (cut with flutes running in the long direction) having dimensions of 2 inches (in)×3 3/16 in and 2 in ×5 1/2 in are bonded by applying 0.00014 lb/in of HMA with an Olinger Bond Tester. The adhesive is applied perpendicular to the flutes in the center of the shorter coupon and the coupons are bonded such that the adhesive is 3/4 in from one end of the long coupon. Five replicates are made for each formulation. Samples are loaded into the sample holder with the short coupon end aligned with the edge of the sample holder. The samples are held in place with the wide plate secured by wingnuts. A 200 g weight is placed 3.94 in from the bond. The weight is secured by placing the peg on the weight into a hole made in the long coupon. The sample holder is then placed into a convection oven at a set temperature for 24 hours. If at least 80% of the bonds do not fail, then the sample is considered to have passing heat resistance at the test temperature. The oven temperature is varied until the maximum passing heat stress resistance is determined. All new bonded coupon samples should be used for each test temperature. Results are reported as heat stress temperature (° C.).

Flex Mandrel Test (3 mm)

Flex mandrel testing is completed according to the Mandrel Bend Test Method (ASTM D3111-99). Test strips are 1 cm wide by 1.5 mm thick. HMA test strips were bent over a mandrel (diameter 3 mm). Using a fresh sample for each test, the test is repeated with smaller diameter mandrels until the adhesive failed on bending. The flexibility of the HMA is the smallest diameter over which 4 out of 5 specimens did not break. Testing is performed at 0° C. and −18° C. Results are reported as mandrel flex value percent (%).

Shear Adhesion Failure Temperature (SAFT)—Shear adhesion failure temperature (SAFT) of each sample was measured according to ASTM D 4498 with a 500 gram weight in the shear mode. The tests were started at room temperature (25° C./77° F.) and the oven temperature was ramped at an average rate of 0.5° C./minute. The temperature at which the specimen failed is recorded.

Peel Adhesion Failure Temperature (PAFT)—Peel adhesion failure temperature (PAFT) was tested according to ASTM D 4498 with a 100 gram weight in the peel mode. The tests were started at room temperature (25° C./77° F.) and the temperature was increased at an average rate of 0.5° C./minute.

Samples for SAFT and PAFT testing are prepared using two sheets of 40 pound Kraft paper, each of about 6×12 in (152×305 mm) dimensions. On the bottom sheet, lengthwise and separated by a gap of 1 in (25 mm), are adhered in parallel fashion two 1.75 or 2 in (45 or 51 mm) wide strips of a one sided, pressure-sensitive tape such as masking tape. The adhesive sample to be tested is heated to 177° C. (350° F.) and is drizzled in an even manner down the center of the gap formed between the tape strips. Then before the adhesive can unduly thicken two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the adhesive in the gap between the tape strips and the second rod evenly compress the second sheet over the top of the gap and on top of the tape strips. Thus a single 1 inch wide strip of sample adhesive is created, between the two tape strips, and bonding the paper sheets. The sheets so bonded are cut crosswise into strips of width 1 inch and length of about 3 inches, each strip having a 1×1 in (25×25 mm) adhesive sample bond in the center. The strips may then be employed in the SAFT or PAFT, as desired.

Some embodiments of the present disclosure will now be described in detail in the following Examples.

EXAMPLES

1. Preparation of Ethylene/α-olefin Multi-block Copolymer

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

Continuous solution polymerizations are carried out in a computer controlled autoclave reactor equipped with an internal stirrer. Purified mixed alkanes solvent (Isopar™ E available from ExxonMobil Chemical Company), ethylene, 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Polymer properties are provided in Table 3A.

TABLE 2

Process details for preparation of exemplary polymer

| Ex. | $C_2H_4$ kg/hr | $C_8H_{16}$ kg/hr | Solv. kg/hr | $H_2$ sccm[1] | T ° C. | Cat A1[2] ppm | Cat A1 Flow kg/hr | Cat B2[3] ppm | B2 Flow kg/hr | DEZ Conc ppm | DEZ Flow kg/hr | Cocat Conc. ppm | Cocat Flow kg/hr | Poly $[C_2H_4]/[DEZ]^{[4]}$ | Rate[5] kg/hr | Conv %[6] | Solids % | Eff.[7] |
|---|---|---|---|---|---|---|---|---|---|---|---|---|---|---|---|---|---|---|
| OBC B | 1.775 | 2.388 | 8.567 | 954.1 | 125 | 106.0 | 0.110 | 25.2 | 0.088 | 5142 | 0.182 | 561.6 | 0.248 | 4430 | 3.02 | 91.8 | 22.4 | 0.202 |

\* Comparative, not an example of the invention

[1]standard cm³/min

[2][N-(2,6-di(1-methylethyl)phenyl)amido)(2-isopropylphenyl)(α-naphthalen-2-diyl(6-pyridin-2-diyl)methane)]hafnium dimethyl

[3][η²-2,6-diisopropyl-N-(2-methyl-3-(octylimino)butan-2-yl)benzenamide]trimethylhafnium

[4]molar ratio in reactor

[5]polymer production rate

[6]percent ethylene conversion in reactor

[7]efficiency, kg polymer/g M where g M = g Hf + g Zr

2. Materials

Materials used in the present examples and the comparative samples are provided in Tables 3A, 3B, and 4 below. Polymers are typically stabilized with one or more antioxidants and/or other stabilizers.

TABLE 3A

Starting Materials-Ethylene/α-olefin Multi-Block Copolymer Ethylene/Octene Multi-Block Copolymer

| Sample | Brookfield Viscosity @ 177° C. | Density, g/cc | C8 Total Mol % | Mn | GPC Mw (g/mol) | Mw/Mn | NMR C8 Soft mol % | NMR C8 Hard mol % | wt % Soft Seg. | wt % Hard Seg. | $T_M$ | MI |
|---|---|---|---|---|---|---|---|---|---|---|---|---|
| Ethylene/octene multi-block copolymer-B | 8,900 | 0.872 | 12.7 | 5,070 | 17,900 | 3.5 | 13 | 5 | 70 | 30 | 92° C. | 1000 |

Source-The Dow Chemical Company

TABLE 3B

Starting Materials Ethylene/α-olefin Random Copolymer

| Sample | Density g/cm$^1$ | Brookfield Viscosity @ 177° C. (cP) | Mw (g/mol) | Mn (g/mol) | Mw/Mn | Heat of Fusion (J/g) | Tm (° C.) |
|---|---|---|---|---|---|---|---|
| AFFINITY ® GA 1900 | 0.8714 | 7,873 | 19,500 | 9,020 | 2.2 | 57 | 67 |

AFFINITY ® GA 1900 is a polyolefin plastomer obtained from The Dow Chemical Co., Midland, MI

TABLE 4

Other Starting Materials

| Component | Specification | Source |
|---|---|---|
| Eastotac ™ H100 | Tackifier-hydrogenated hydrocarbon resin, having molten Gardner color of 4 Viscosity, Brookfield 200 cP @ 190° C. Softening Point: 100° C. (ASTM E 28) | Eastman |
| BE Square ™ 175 | Micro-crystalline wax Melting Point 84° C. Viscosity @99° C. 13 mPa-s | Baker-Hughes |
| Sasol C80 | Fischer-Tropsch wax Melting point 80° C. | Sasol |
| Paraffin wax Product # 32720-04 | Paraffin wax Melting point 53-57° C. | Sigma-Aldrich |

3. Preparation of Adhesive Formulations

The components in Tables 3A, 3B, and 4 are mixed in the proportions set forth in Table 5 below.

Components for the HMA compound are weighed into an aluminum can (3" diameter ×6" long) and preheated in an oven at 180° C. for 1 hour. The components are then further mixed in a heated block with the can at 180° C. under nitrogen purge for 20 minutes using a Paravisc-style impeller at 100-150 rpm. The melt is removed from the can and cooled to room temperature.

4. Hot Melt Adhesive Compositions

Hot melt adhesive compositions shown in Table 5. Examples (Ex) 1-2 contain ethylene/α-olefin multi-block copolymer-B as the polymeric component. Comparative samples (CS) A-C contain AFFINITY GA 1900 as the polymeric component. The tackifier is Eastotec H100 (H100). The wax component is varied. The properties for each composition are provided in Table 5 below.

TABLE 5

|  | Ex 1 | Ex 2 | CS - A | CS-B | CS-C |
|---|---|---|---|---|---|
| ethylene/α-olefin multi-block copolymer-B | 30 | 30 |  |  |  |
| GA1900 |  |  | 30 | 30 | 30 |
| H100 tackifier | 42 | 42 | 42 | 42 | 42 |
| C80 |  |  | 28 |  |  |
| BE 175 | 28 |  |  | 28 |  |
| Paraffin |  | 28 |  |  | 28 |
| TOTAL (wt %) | 100 | 100 | 100 | 100 | 100 |
| Viscosity (cP) | 1673 | 1184 | 1040 | 1450 | 1018 |
| Softening point (° C.) | 85.1 | 82.6 | 86.2 | 78.2 | 75.2 |
| PAFT (° C.) | 40.2 | 35.9 | 46.7 | 41.3 | 34.7 |
| SAFT (° C.) | 74.9 | 72.5 | 75.1 | 68 | 64.5 |
| Heat Stress (° C.) | 40 | 37.5 | 37.5 | <35 | <35 |
| Flex mandrel 0° C. | 100 | 100 | 100 | 100 | 0 |
| Flex mandrel (−18° C.) | 100 | 100 | 0 | 60 | 0 |

5. Discussion

Applicant discovered that the present ethylene/α-olefin multi-block copolymer enables the use of alternative waxes in hot melt adhesive composition. In particular, the present hot melt adhesive compositions may contain a paraffin wax or a microcrystalline wax. Paraffin wax is typically not used in hot melt adhesives because of poor heat resistance. In a typical hot melt adhesive composition, the polymer component provides the strength for the adhesive bond while the wax reduces the viscosity of the overall system. Bounded by no particular theory, it is believed the ethylene/α-olefin multi-block copolymer of the present HMA composition functions as both the polymer component and as the wax component. The hard segments (with higher melting point compared to the soft segments) of the present ethylene/α-olefin multi-block copolymer provide heat resistance while the soft segments (with lower melting point relative to the hard segments) provide flexibility and adhesion.

The present disclosure enables the preparation of a hot melt adhesive composition containing low cost paraffin wax while the present HMA composition simultaneously has the same or improved properties when compared to HMA compositions made with more expensive Fischer-Tropsch waxes. The present disclosure provides adhesive formulators more options in component selection for hot melt adhesives.

It is specifically intended that the present disclosure not be limited to the embodiments and illustrations contained herein, but include grafted forms of those embodiments including portions of the embodiments and combinations of elements of different embodiments as come within the scope of the following claims.

The invention claimed is:

1. A hot melt adhesive composition comprising:
a) an ethylene/α-olefin multi-block copolymer having a weight average molecular weight (Mw) less than 20,000;
b) a tackifier having a softening temperature from 90° C. to 150° C.;
c) a wax; and
wherein the composition has a PAFT from 30° C. to 50° C. and a SAFT from 65° C. to 85° C.

2. The composition of claim 1 wherein the ethylene/α-olefin multi-block copolymer comprises from 25 wt % to 35 wt % hard segments and from 65 wt % to 75 wt % soft segments and the soft segments comprise from 10 mol % to 15 mol % α-olefin.

3. The composition of claim 1 wherein the α-olefin is octene and the ethylene/octene multi-block copolymer has a density from 0.86 g/cc to 0.89 g/cc and a melt temperature, Tm, from 80° C. to 100° C.

4. The composition of claim 1 wherein the ethylene/α-olefin multi-block copolymer has a Brookfield viscosity at 177° C. from 500 centipoise to 10,000 centipoise.

5. The composition of claim 1 wherein the ethylene/α-olefin multi-block copolymer has a melt index from 100 g/10 min to 2000 g/10 min.

6. The composition of claim 1 comprising
a) from 15 wt % to 50 wt % ethylene/α-olefin multi-block copolymer;
b) from 25 wt % to 60 wt % tackifier; and
c) from 15 wt % to 45 wt % wax selected from the group consisting of paraffin wax, microcrystalline wax, and combinations thereof; and
the composition has a mandrel flex value (0° C.) from 80% to 100% and a mandrel flex value (−18° C.) from 80% to 100% as measured in accordance with ASTM D 522.

7. The composition of claim 6 wherein the composition has a viscosity from 500 centipoise to 10000 centipoise.

8. The composition of claim 6 wherein the composition has a softening point from 75° C. to 95° C.

9. The composition of claim 6 wherein the composition has a heat stress temperature from 30° C. to 70° C.

10. The composition of claim 1 wherein the wax is a paraffin wax.

11. An article comprising at least one component comprising the composition of claim 1.

* * * * *

UNITED STATES PATENT AND TRADEMARK OFFICE
CERTIFICATE OF CORRECTION

PATENT NO. : 9,969,912 B2  Page 1 of 1
APPLICATION NO. : 15/100497
DATED : May 15, 2018
INVENTOR(S) : Colin LiPiShan, Cynthia L. Rickey and Alec Y. Wang It is certified that error appears in the above-identified patent and that said Letters Patent is hereby corrected as shown below:

On the Title Page

Left column, (72) Inventors: Replace "Alex Y. Wang" with --Alec Y. Wang--.

Signed and Sealed this
Twenty-sixth Day of June, 2018

Andrei Iancu
*Director of the United States Patent and Trademark Office*